United States Patent [19]

Scafetta

[11] 4,067,107

[45] Jan. 10, 1978

[54] SNOW AND ICE REMOVER

[76] Inventor: Philip Scafetta, Snyder Road, R.D. No. 1, Green Lane, Pa. 18054

[21] Appl. No.: 792,785

[22] Filed: May 2, 1977

[51] Int. Cl.$^2$ .................. A47L 1/06; A47L 13/08
[52] U.S. Cl. .................................. 30/136.5; 30/169; 15/236 R
[58] Field of Search .............. 30/169, 136.5, 172; 15/236 R

[56] References Cited

U.S. PATENT DOCUMENTS

| 1,412,728 | 4/1922 | Werner | 30/169 |
| 2,649,604 | 8/1953 | Hess | 30/169 X |
| 3,408,681 | 11/1968 | Isakson | 15/236 R |

Primary Examiner—Jimmy C. Peters
Attorney, Agent, or Firm—Joseph Scafetta, Jr.

[57] ABSTRACT

A hand implement for engaging and removing snow and ice from curved and/or flat surfaces, such as windshields, windows, hoods, roofs, and trunk lids of motor vehicles and the like, comprises a generally dustpan-shaped plastic member. The plastic member has a planar surface, a leading edge on the forward end of the planar surface, a manual grip at the rear end of the plastic member, a barrier positioned rearwardly of said leading edge for keeping snow and ice away from the manual grip, and side walls extending rearwardly from the leading edge. Optionally, a handle is detachable from the rear of the plastic member. The leading edge flexes to conform to any curvature of the curved and/or flat surfaces and scrapes snow and ice from the surfaces without causing damage to them. Preferably, the generally dustpan-shaped plastic member is a one-piece, integrally molded structure about twelve inches wide.

8 Claims, 8 Drawing Figures

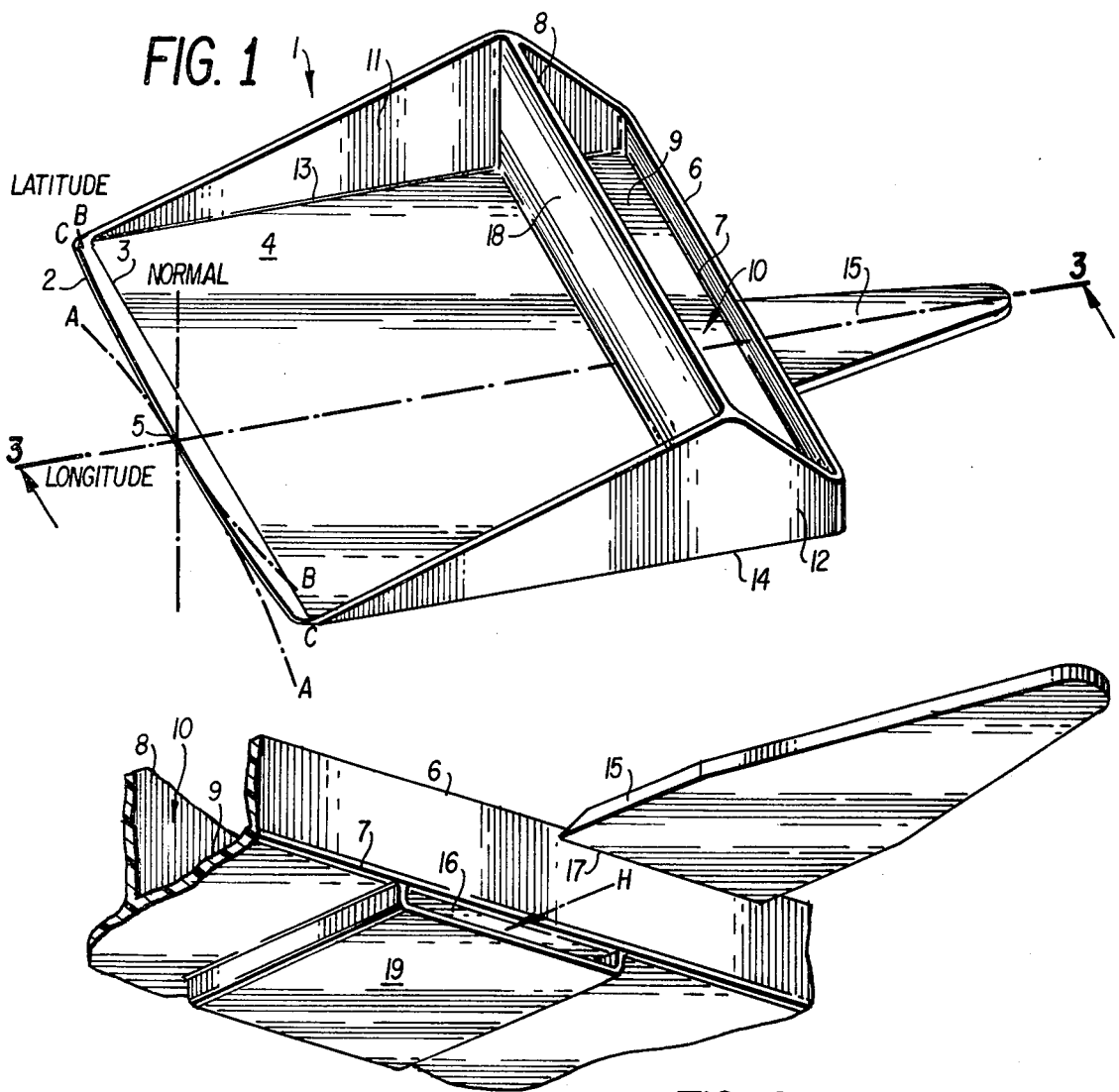
FIG. 1
FIG. 2
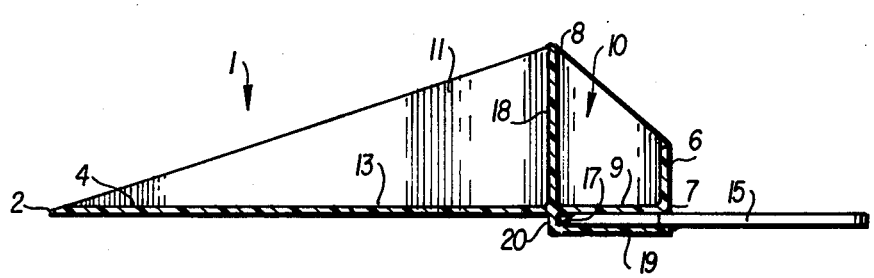
FIG. 3

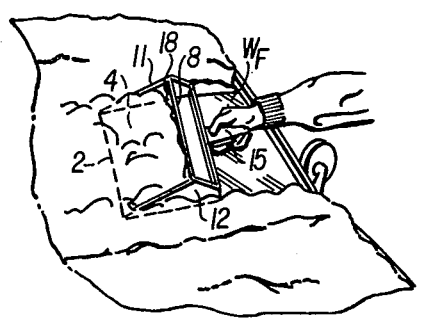
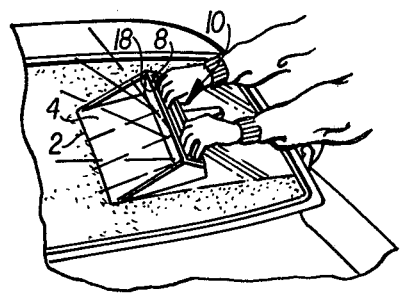
FIG. 4  FIG. 5
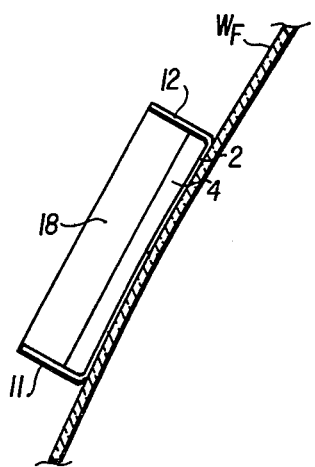
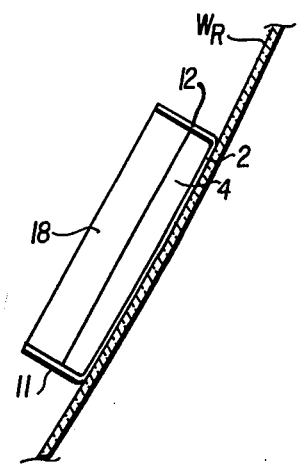
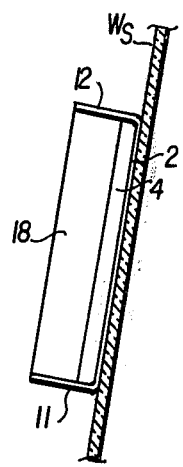
FIG. 6A  FIG. 6B  FIG. 6C

SNOW AND ICE REMOVER

BACKGROUND OF THE INVENTION

1. Field of the Invention

This invention relates to general cleaning, in particular, to scrapers for removing snow and ice from curved and/or flat surfaces.

2. Description of the Prior Art

In cold climates motorists face the chore each winter of cleaning the windshields, windows, hoods, roofs, and trunk lids of their vehicles after every snowfall and ice storm. Most motorists carry small hand implements in their vehicles for cleaning at least the windshields and windows after a light snowfall or when a thin ice layer has formed overnight. However, after a heavy snowfall, the small hand implement is useless in cleaning the hoods, roofs, and trunk lids, requires many strokes to clean the windshields and windows, and does not protect the user's hands and fingers against snow and ice thrown rearwardly by the scraping edge of the implement. Thus, the motorist must use a large brush, broom, and/or shovel to help remove the snow efficiently and quickly, concomitantly risking damage to the surfaces being cleaned. Although the small hand implement usually fits into a motor vehicle glove compartment, it is often cumbersome for the motorist to carry around an additional large implement, especially in a small automobile.

A small hand implement that protects the user's fingers against snow and ice thrown rearwardly is shown in U.S. Pat. No. 3,651,572. However, the box-like structure makes the scraping edge inflexible and thus incapable of conforming to curved surfaces. A hand implement that has an edge capable of conforming to curved surfaces is shown in U.S. Pat. No. 2,265,551. However, the edge is made of rubber and is designed for removing water in a pulling action and is incapable of scraping snow and ice in a pushing action. The use of multiple hand implements for removing snow and ice from motor vehicles is shown in U.S. Pat. No. 2,639,454. However, the implements with scraping edges present no barrier against snow and ice thrown rearwardly onto the user's hands and fingers.

Thus, it remains a problem in the cleaning art to provide a single, inexpensive hand implement for efficiently and quickly removing snow and ice from the curved and/or flat surfaces of motor vehicles without causing damage to them.

SUMMARY OF THE INVENTION

It is a primary object of the invention to provide a single, inexpensive hand implement for efficiently and quickly removing snow and ice from the curved and/or flat surfaces of motor vehicles without causing damage to them by providing a generally dustpan-shaped plastic member, preferably, a one-piece, integrally molded structure about 12 inches wide. The advantage of the dustpan shape is that the motorist may use the invention to scoop off and scrape away a larger amount of accumulated snow and ice from the motor vehicle surfaces than he or she is able to remove with a small conventional hand implement.

The plastic member has a planar surface and a leading edge on the forward end of the planar surface for engaging and removing snow and ice from curved and/or flat surfaces. The leading edge is sufficiently rigid in the direction of the longitudinal axis of the planar surface to engage and remove snow and ice from the curved and/or flat surfaces. The leading edge is also sufficiently flexible in the direction normal to the longitudinal axis of the planar surface to permit a substantial portion of the leading edge to conform to any curvature of the curved and/or flat surfaces without causing damage to the surfaces when the leading edge is pressed against such surfaces.

Side walls extend rearwardly from the leading edge and lend rigidity to the leading edge in the direction of the longitudinal axis of the planar surface.

A manual gripping means at the rear end of the plastic member transmits both flexing and scraping force from the user through the plane of the planar surface to the leading edge in the direction of the longitudinal axis of the planar surface.

A barrier is positioned rearwardly of the leading edge and extends from the planar surface. The advantage of the barrier is that it sets off the manual gripping means and protects the user's hands and fingers against snow and ice thrown rearwardly by the leading edge while it is scraping. Preferably, a detachable handle, for example, in the nature of a conventional small hand implement, may be releasably secured by any suitable retaining means to the rear of the plastic member, most conveniently, to the underside thereof.

DESCRIPTION OF THE DRAWINGS

FIG. 1 is an isometric view taken from the left front upper corner of the preferred embodiment of the hand implement.

FIG. 2 is a partial isometric view taken from the left rear lower corner of the preferred embodiment with an optional handle detached from a snug pocket on the underside of the hand implement.

FIG. 3 is a cross-sectional elevational view taken along line 3—3 of FIG. 1.

FIG. 4 is a view illustrating the use of the preferred embodiment in scooping snow from the front windshield of an automobile.

FIG. 5 is a view illustrating the use of the preferred embodiment in scraping ice from the same windshield.

FIG. 6A is a schematic front view illustrating the curvature of the preferred embodiment in scraping ice from a convexly curved surface, such as the front windshield of an automobile.

FIG. 6B is a schematic front view illustrating the curvature of the preferred embodiment in scraping ice from a concavely curved surface, such as the rear window of an automobile.

FIG. 6C is a schematic front view illustrating the curvature of the preferred embodiment in scraping ice from a flat surface, such as a side window of an automobile.

DESCRIPTION OF THE PREFERRED EMBODIMENT

In FIGS. 1 and 3, the preferred embodiment of the hand implement has a plastic member 1 being generally dustpan-shaped. A thin, leading edge 2 along a latitudinal axis of plastic member 1 is fixed onto the forward end 3 of a planar surface 4. The leading edge 2 for engaging and removing snow and ice is slightly wider at its midsection 5 than at its outer ends, thus presenting a slight forward curvature that facilitates scraping action by providing at the midsection 5 an area of force concentration against tenacious ice.

A first wall 6 of a first height is positioned along the trailing edge 7 of the plastic member 1. The wall 6 need not be immediately at the trailing edge 7 but may be spaced a very short distance therefrom. Wall 6 runs substantially across the entire trailing edge 7 and is substantially parallel thereto. However, the trailing edge 7 may be slightly contoured rather than straight, in which case the wall 6 would follow substantially the contour of the trailing edge 7. Optionally, the wall 6 may be omitted.

A second wall or barrier 8 of a second height is higher than the first wall 6 and is sufficiently high to stop any snow and ice thrown rearwardly by the leading edge 2 under normal use. A 2-inch high barrier 8 has been found to be minimally effective but a barrier 8 at least three inches high is preferred. A barrier 8 is parallel to and spaced at a slight distance from the wall 6. Barrier 8 runs substantially across the entire width of the planar surface 4 and is positioned rearwardly of the leading edge 2 but is substantially closer to the wall 6 than to the leading edge 2. A portion 9 is set off between trailing edge 7 and barrier 8 from the rest of planar surface 4. Optionally, the portion 9 may be inclined at a slight angle from the plane of the planar surface 4. Thus, the trailing edge 7 and the barrier 8 together with the portion 9 define a manual gripping means 10 by which a motorist uses his or her fingers in order to grip the plastic member 1, as best shown in FIG. 5.

Side walls 11 and 12 are spaced from and parallel to each other. They extend rearwardly from the leading edge 2 and are positioned along the side edges 13 and 14, respectively, of the planar surface 4. As best shown in FIG. 2, a handle 15 is releasably secured for attachment to and detachment from the plastic member 1 in a snug plastic socket or pocket 16 at the rear of plastic member 1. Pocket 16 is preferably formed by a U-shaped plastic retaining means 19 integrally molded to the underside of plastic member 1. Retaining means 19 has a front stop 20, shown in FIG. 3, against which the sharp, rigid edge 17 of handle 15 abuts when handle 15 is inserted into pocket 16, as indicated by the arrow H in FIG. 2. The handle 15 has smooth surfaces and side edges so that a user does not injure himself or herself. The handle 15 may be integrally molded as a part of plastic member 1 or may be a small conventional hand scraper of any width. The edge 17 of handle 15 is sharp and rigid for scraping tenacious ice in difficult locations, such as the corners of small side vent windows of an automobile. Optionally, the handle 15 and the pocket 16 may be omitted.

Although each of the described elements of the plastic member 1 may be separately formed and secured to each other to form member 1, it is preferred to fabricate the member 1 into a one-piece, integrally molded structure from hard but slightly flexible plastic material, such as nylon, polyvinylchloride, polystyrene, or any thermoset suitably resistant to cracking and warping caused by atmospheric temperatures below the freezing point of water. If separate parts are to be formed for later securement to each other, the preferred material is conventional thin nylon sheeting. If all elements of plastic member 1 are molded into a one-piece integral structure, provision may also be made in the mold by use of an insert for integrating the retaining means 19. Other separate retaining means, such as metal spring clips or a detent, may be suitable for releasably securing the handle 15 to the plastic member 1.

The hand implement of the present invention performs the function of engaging and removing snow and ice from curved and/or flat surfaces, such as windshields, windows, hoods, roofs, and trunk lids of motor vehicles and the like, more efficiently and quickly than the usual small, narrow hand implement distributed free of charge at many automobile service stations for several reasons. First, the width of the generally dustpan-shaped plastic member 1 is more than six inches, preferably about twelve inches. In contrast to the usual width of three to four inches for most prior art hand implements, the width of the plastic member 1 of the present invention lends the desired flexibility to the leading edge 2 and accommodates the insertion of the user's fingers into the manual gripping means 10, as best shown in FIG. 5. Second, the leading edge 2 of the twelve-inch wide hand implement accelerates snow and ice removal by flexing and scooping clean one-half of any conventional front convex windshield $W_F$ or of any rear concave window $W_R$ or of any side flat window $W_S$, such as those illustrated in FIGS. 6A, 6B, and 6C, respectively, in only two or three movements. Third, during the course of such movements, the snow and ice is prevented by the height of barrier 8 from contacting the user's hands or fingers, thus avoiding discomfort to the user while he or she is performing the chore of cleaning the automobile surfaces.

The use of the hand implement is shown in FIGS. 4 and 5. During or after an appreciable snowfall, the plastic member 1 is first used as a scoop, as shown in FIG. 4, by manually gripping handle 15 to remove the accumulated snow from the front windshield $W_F$ and other parts of the user's automobile. The leading edge 2 is sufficiently rigid in the direction of the longitudinal axis of the planar surface 4 to slice through the snow and ice. The side walls 11 and 12 lend rigidity to the leading edge 2 in the direction of the longitudinal axis of the planar surface 4. During the scooping action, the snow received on the planar surface 4 is confined between side walls 11 and 12 and is piled up against the front face 18 of the barrier 8.

After the top snow has been removed, the plastic member 1 is used as a scraper, as shown in FIG. 5, to remove the tenacious snow or ice clinging to the windshield, windows, and other parts of the automobile. The user places his or her fingers behind the barrier 8 and places the thumbs on the underside of portion 9 in order to grip manually the plastic member 1. When the user pushes forward and simultaneously presses downward against the surface to be cleaned, a substantial portion of the leading edge 2, being sufficiently flexible in the direction normal to the plane defined by the intersection of the longitudinal and latitudinal axes of the planar surface 4, will conform to the convex contour of the front windshield $W_F$ shown in FIG. 6A, or to the concave contour of the rear window $W_R$ shown in FIG. 6B, or to the flat surface of side window $W_S$ shown in FIG. 6C. It other words, if a surface is flat, the leading edge 2 will not flex but will remain in the position C shown in FIG. 1. If the surface is convex, the leading edge 2 will flex into position A; if concave, position B; both positions being denoted by dotted lines in FIG. 1. The user transmits both flexing and scraping force from the manual gripping means 10 through the plane of the planar surface 4 to the leading edge 2 in the direction of said longitudinal axis in order to scrape snow and ice from the curved and/or flat surfaces without causing damage to said surfaces.

Any snow or ice that is thrown rearwardly by the leading edge 2 will strike the front face 18 of the barrier 8, as shown in FIG. 5, and will not land on the user's hands or fingers that may be grasping the manual gripping means 10.

The present invention may be easily stored under the front automobile seat or in the trunk, thus obviating the problem of storing two or more cleaning devices in different areas of the automobile, for example, a small hand implement in the glove compartment and a large brush, broom and/or shovel on the back seat or in the trunk.

The foregoing preferred embodiment is considered as illustrative only. Numerous modifications and changes will readily occur to those skilled in the art.

I claim:

1. A hand implement for engaging and removing snow and/or ice from curved and/or flat surfaces, such as windshields, windows, hoods, roofs, and trunk lids of motor vehicles and the like, comprising:

a generally dustpan-shaped plastic member having
   a. a planar surface;
   b. a leading edge on the forward end of said planar surface, said leading edge being sufficiently rigid in the direction of the longitudinal axis of said planar surface to engage and remove snow and/or ice from said surfaces and sufficiently flexible in the direction normal to said longitudinal axis of said planar surface to permit a substantial portion of said leading edge to conform to any curvature of said curved and/or flat surfaces when said leading edge is pressed against said curved and/or flat surfaces;
   c. a manual gripping means for said plastic member at the rear end of said plastic member, said manual gripping means transmitting both flexing and scraping force from the user through the plane of said planar surface to said leading edge in the direction of the longitudinal axis of said planar surface, without causing damage to said curved and/or flat surfaces;
   d. side walls extending forwardly from said manual gripping means to said leading edge, said side walls lending rigidity to said leading edge in the direction of the longitudinal axis of said planar surface; and
   e. barrier means positioned forwardly of said manual gripping means and rearwardly of said leading edge and extended from said planar surface for keeping snow and/or ice away from said manual gripping means.

2. A hand implement, according to claim 1, further comprising a detachable handle attached at the rear of said plastic member.

3. A hand implement, according to claim 2, further comprising means on said plastic member for releasably securing said handle to said plastic member.

4. A hand implement, according to claim 1, wherein said plastic member is a one-piece, integrally molded structure.

5. A hand implement, according to claim 1, wherein said plastic member is at least 6 inches wide.

6. A hand implement according to claim 1, wherein said plastic member is about 12 inches wide.

7. A hand implement according to claim 1, wherein said barrier means is at least 2 inches high.

8. A hand implement according to claim 1, wherein said barrier means is about 3 inches high.

* * * * *